W. O. STARK.
EXCAVATOR.
APPLICATION FILED NOV. 28, 1908.

936,179.

Patented Oct. 5, 1909.
10 SHEETS—SHEET 1.

Witnesses:
C B Knudsen
A. G. Peterson

Inventor:
William O. Stark
By Michael J Stark + Sons.
Attorneys.

W. O. STARK.
EXCAVATOR.
APPLICATION FILED NOV. 28, 1908.

936,179.

Patented Oct. 5, 1909.
10 SHEETS—SHEET 2.

FIG. 3.

Witnesses:
C B Knudsen
A. G. Peterson

Inventor:
William O. Stark.
By Michael J Stark & Sons,
Attorneys.

UNITED STATES PATENT OFFICE.

WILLIAM O. STARK, OF CHICAGO, ILLINOIS.

EXCAVATOR.

936,179.     Specification of Letters Patent.     Patented Oct. 5, 1909.

Application filed November 28, 1908. Serial No. 464,968.

*To all whom it may concern:*

Be it known that I, WILLIAM O. STARK, a citizen of the United States, and a resident of Chicago, in the county of Cook, in the State of Illinois, have invented certain new and useful Improvements in Excavators; and I do hereby declare that the following description of my said invention, taken in connection with the accompanying sheets of drawings, forms a full, clear, and exact specification, which will enable others skilled in the art to which it appertains to make and use the same.

This invention has general reference to excavating and trenching machines; and it consists, essentially in the novel and peculiar combination of parts, and details of construction, as hereinafter first fully set forth and described, and then pointed out in the claims.

The object of this invention is the production of a successful clam-shell or orange-peel excavator in which the bucket can be mechanically forced into the soil, when the bucket is open, and held there while its leaves are being closed. Numerous attempts have been made in this direction, but with only partial success. To attain such results requires that the construction of the parts must be so rigid by masses of metal properly placed to absorb the stresses due to the severe duties demanded of a machine of this nature, and its parts must be so carefully designed and the engine-power so great, that the force applied at the bucket-point will be sufficient to lift the heavy end of the machine from the ground, if necessary, to insure a bite of the bucket. Such a machine must also be mobile and it must be so constructed that no "taking down" is required to move from place to place. It must, furthermore, possess its own means to quickly overcome being "mired" on soft roads while traveling, and it should be so constructed that absolute control of all functions and movements can be had by the runner or operator, with a minimum of controlling levers.

To attain these results, my excavator consists briefly, of a heavy structural sub-frame, or truck, with ample steering and propelling wheels, upon which is mounted a turn-table fitted with anti-friction rollers, and upon which are mounted all the operating mechanism, engines, boiler and other apurtenants, as will hereinafter more fully appear.

In the drawings, already referred to and forming part of this specification, Fig. 9 is a sectional plan of the compensating mechanism of the driving gearing for the machine. Fig. 10 is a plan, and Fig. 11 a side-elevation of the clamping-collar used in this machine. Fig. 24 is a side-elevation, and Fig. 25 an end-elevation of the same. Fig. 31 is a side-elevation of portions of the turn-table and its accessories, illustrating the various levers and the foot-treadle by means of which the several movements of the machinery are governed. Fig. 32 is a transverse sectional-elevation of the same, in line z, z, of Fig. 31. Fig. 33 is an elevation of one of the brackets 27, forming the journals for the traction gearing, and Fig. 34 an inverted plan of the same.

Like parts are designated by corresponding symbols of reference in all the figures.

Figure 1:
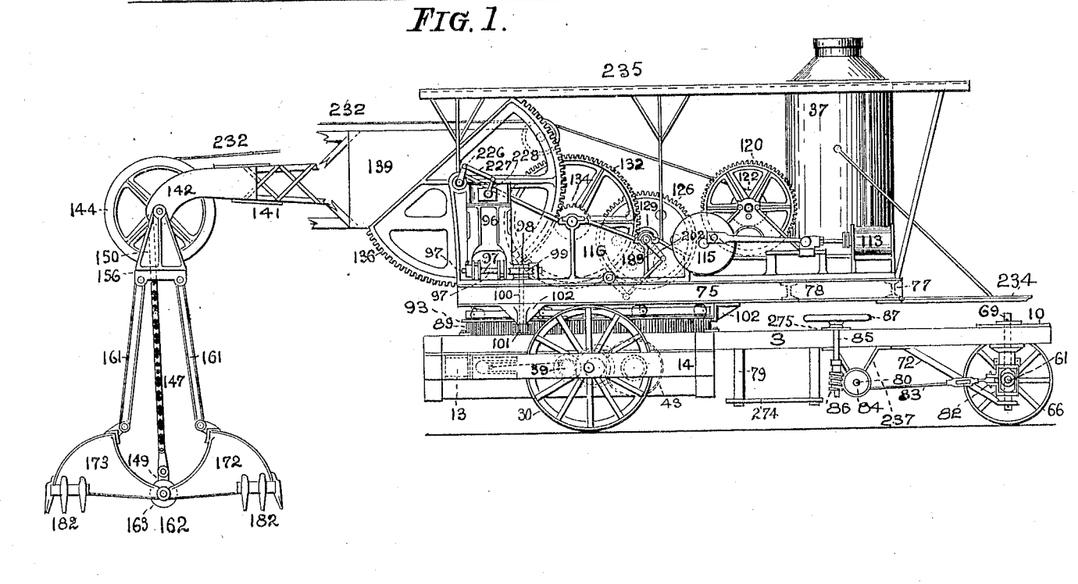
Figure 1 is a side-elevation of my improved excavating and trenching machine, part of the boom being broken away.
Figure 2:
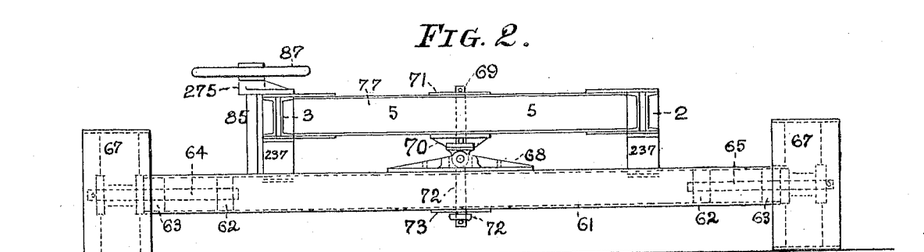
Fig. 2 is a front-elevation of the rear truck and portion of the sub-frame.
Figure 3:
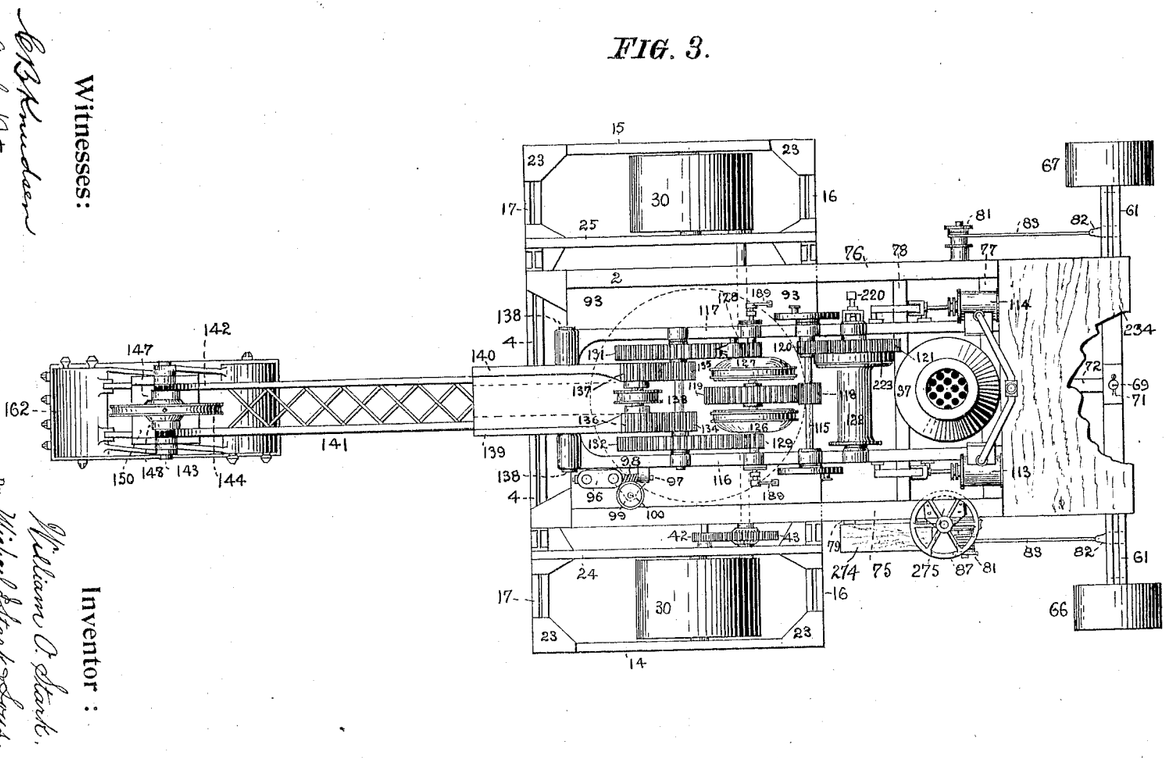
Fig. 3 is a plan of the machine.
Figure 5:
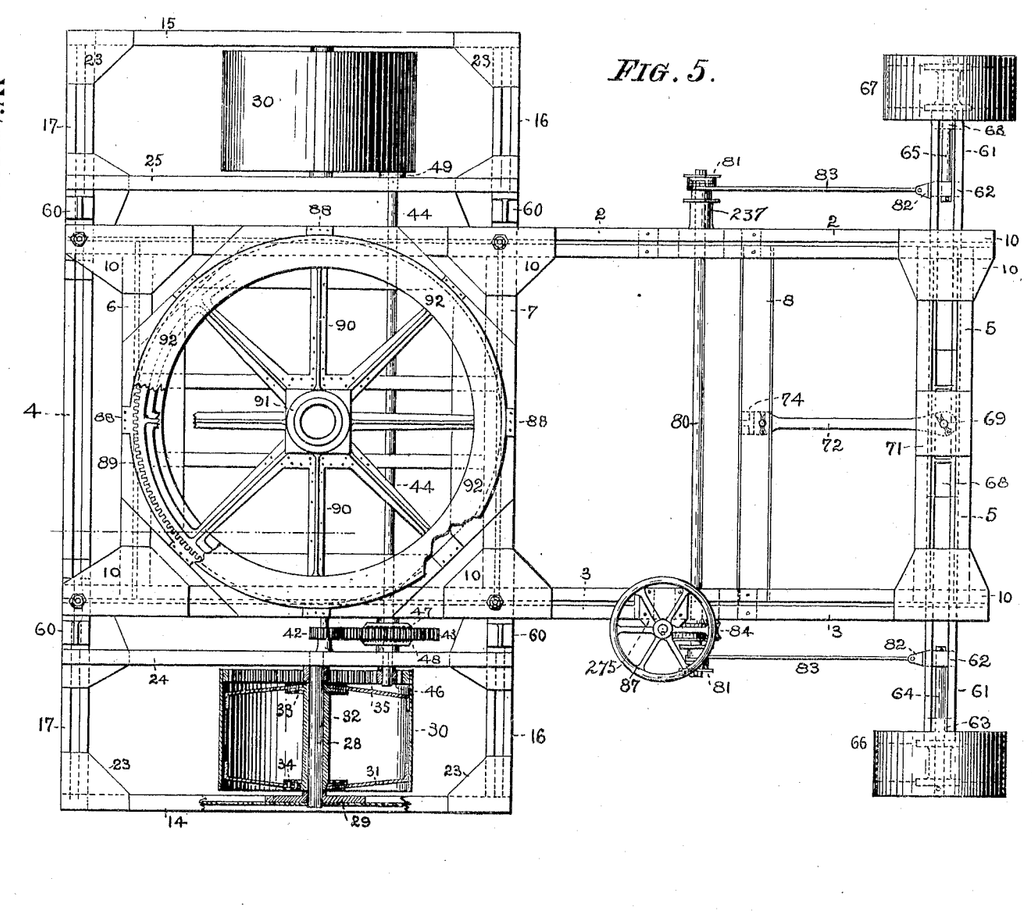
Fig. 5 is a plan of the sub-frame with its front, and rear trucks and its steering mechanism, and a portion of the turn-table, a portion of the latter being broken away to expose underlying parts.

The main or sub-frame of this machine, shown most clearly in Fig. 5, and also in Figs. 1, 2 and 3, consists of two longitudinal pairs of channel-beams, 2, 3, and two pairs of transverse channel-beams 4, 5, Fig. 5, at the extreme ends of the longitudinal beams, and further, intermediate pairs of cross beams 6, 7, and 8 respectively, all of which are securely united together by gusset-plates 10, in the usual manner of constructing such parts from so-called structural steel. This sub-frame is mounted upon a propelling truck, shown in detail in Fig. 6, and also in Fig. 5, the former figure showing one-half of said truck, the other half being the same as the one shown, except that one of the two longitudinal I-beams, 11 and 12, which carry the propelling-engine 13, is omitted. This propelling truck consists of two pairs of longitudinal I-beams, 14, 15, and two pairs of transverse channel-bars, 16 and 17, the pair of I-beams 11 and 12 already mentioned, which are located below the transverse channel-bars 16 and 17; I-beams 24, 25, a longitudinal I-beam 18, also located below the channel-bars 16 and 17, and a transverse I-beam 19. These longitudinal beams 11 and 12 are sustained by braces, 20, and the longitudinal beam 18 by braces 21, while the beam 19 is supported by braces 22, all as clearly illustrated in Fig. 6. All these various beams are, furthermore, united together by gussets 23, in the usual manner of structural-steel construction. Two I-beams, 24, 25 located above the transverse channel-bars 16, 17, and securely braced by straps, 26, connect the I-beams 24 and 25 to form means for suspending therefrom two brackets 27, which form the inner bearings for the wheel-axles 28, there being two outer bearings, 29, Fig. 5, for said wheel-axles, which axles 28 are stationary, and upon which the two driving traction-wheels 30 revolve. This truck, which hereafter will be called the front-truck, owing to the fact that when the machine is in operation, that end of the same under which this truck is located, is usually thus designated, notwithstanding the fact that when the machine is moving from place to place, the opposite end of the machine would be the forward end.

Figures 8, 9, 10, 11:
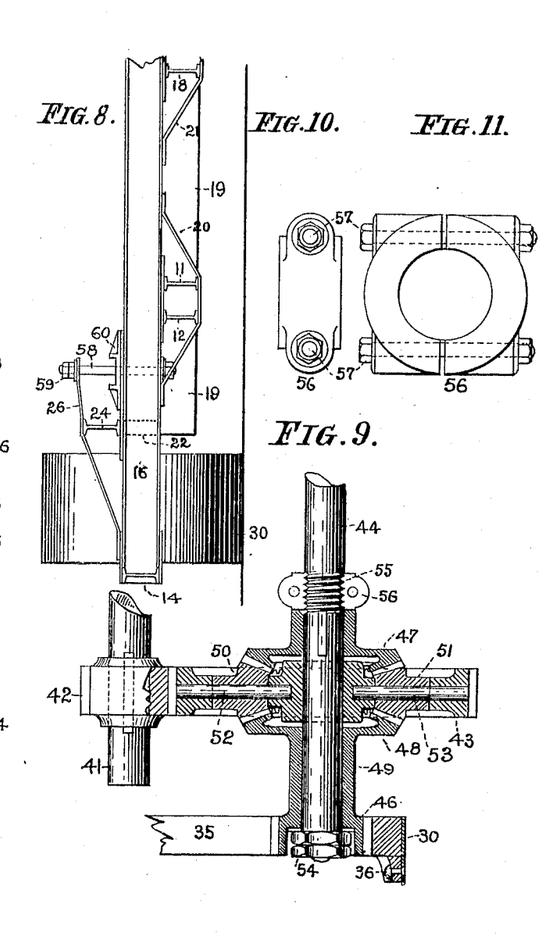

The traction-wheels 30 shown in detail in Fig. 5, are of considerable diameter and very wide face, and consist of sheet-metal rims fitted with spokes 31, terminating in flanges 33, 33, on the hub 32, to which flanges the spokes 31 are riveted as shown at 34; the outer ends of the spokes 31 being securely fastened to the said rims. Within these wheel-rims are placed toothed rings 35, shown in Fig. 5 and riveted into the rims as illustrated in Fig. 9 at 36, thereby serving as an internal gear to rotate the traction wheels in the following manner: The engine 13, which is a double-cylinder steam-motor supplied with steam from the steam generator 37 by means of a steam-hose, not shown, carries on its crank-shaft 38, Fig. 6, a pinion, 39, which meshes into a spur-wheel, 40, keyed to the counter-shaft 41 upon which shaft is also keyed a pinion, 42, engaging a differential-gear mechanism consisting of the spur-wheel 43, revolving loosely upon a shaft, 44, having its bearings on both ends within the brackets 27, shown in detail in Figs. 33 and 34, and also in bearings 45 upon the longitudinal beams 12 and 18.

Upon the shaft 44 is keyed a bevel-wheel 47, Fig. 9, on one side of the spur-gearing 43, and a similar bevel-wheel, 48, upon the opposite side, the latter wheel being formed integral with a sleeve 49, carrying on its end a pinion 46, meshing with the internal spur-wheel 35 in the traction-wheel 30, said bevel-wheel 48 and its sleeve 49 and pinion 46 revolving loosely upon the shaft 44. The opposite end of the shaft 44 carries a pinion 49, Fig. 5, permanently affixed to said shaft 44.

In the spur-wheel 43 there are two, or more, bevel pinions 50 and 51, loosely revolving upon shafts 52, 53, and engaging the bevel-wheels 47 and 48 in the manner illustrated in Fig. 9. The shaft 44 is threaded at its end with a right and left screw-thread, fitted with nuts 54 to retain the pinion 46 and its appurtenants in operative position, the sleeve 49 forming also a journal which revolves in a bearing 229, Figs. 33 and 34, in the downwardly pending bracket 27, securely fixed to the under side of the longitudinal I-beams 24 and 25, placed upon the transverse-beams 16 and 17 of the traction-truck shown in Fig. 6. This bracket, of which there are two; one secured to the underside of the I-beam 24 already mentioned, and the other underneath the I-beam 25, Fig. 5, has also a journal, 230, for the axle 28 of the traction-wheels 30, and a further journal 231, for the engine counter shaft 41, which connects the engine 13 with the differential gearing shown in detail in Fig. 9.

The differential gearing described is of well-known construction, and its operation will, therefore, be omitted, at this time. In order to prevent the bevel-pinion 47, Fig. 9, from moving laterally upon the shaft 44, there is a screw-thread 55, cut upon the shaft 44, and a clamping-collar 56 secured thereon, which clamping-collar is clearly illustrated in Figs. 10 and 11, and consists of two similar halves, internally screw-threaded and fitted with clamping-bolts 57, by means of which the two halves of the clamping-collar are securely fixed upon said shaft 44. These clamping-collars, as described, are used in this machine on several other occasions hereinafter to be referred to, and it is understood that wherever clamping-collars are referred to, they are of the construction just described.

Figure 6:
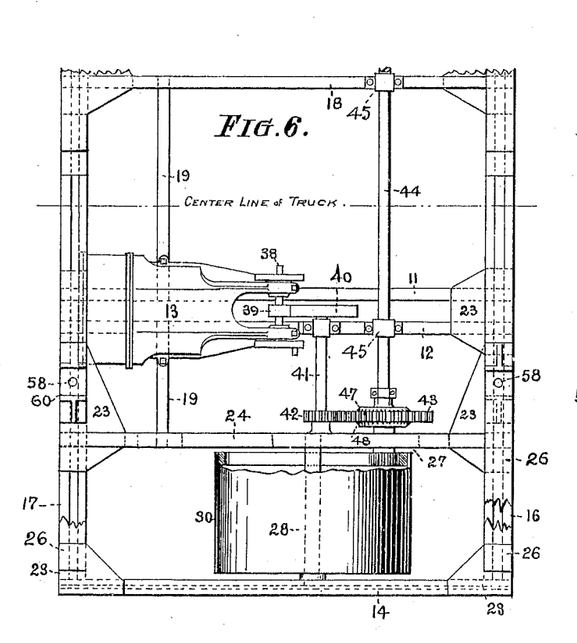
Fig. 6 is a plan of one-half of the front-truck, showing the mechanism for propelling the machine.
Figure 7:
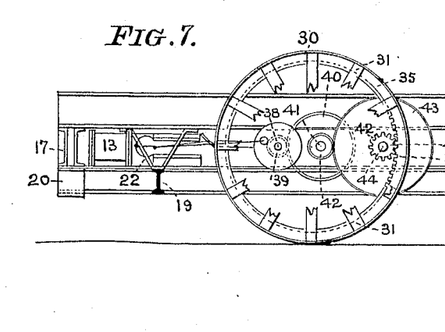
Fig. 7 is a side-elevation, and Fig. 8 an end-elevation of the same.

In the truck-frame already described, there are four bolts, 58, Figs. 6 and 8, by means of which the entire truck-frame and its appurtenants are removably attached to the main or sub-frame heretofore mentioned; such construction being necessary in order to enable the machine being loaded upon cars, it being of such a height that it cannot be shipped by rail in its entirety, but has to be dismounted, and this is readily accomplished by removing the nuts 59 from these bolts, and removing the truck from the sub-frame, without removing any other essential part or parts of the machine.

In order to properly place the truck-frame under the sub-frame, there are located shoes, 60, upon the transverse channel-bars 16 and 17, Figs. 5, 6 and 8, through which the bolts 58 pass, and into which shoes the longitudinal channel-beams 2, 3, of the sub-frame snugly fit. (See Fig. 5.)

The rear-end of the sub-frame (being the forward-end when the machine is moving from place to place, as already stated,) is supported upon, and steered by, a steering truck and steering mechanism consisting, as shown in Figs. 2 and 5, and also in various other figures, of a double I-beam 61, carrying on both ends bearings, 62 and 63, within which shafts 64, 65, are mounted that carry at their outer-ends the traction and steering-wheels 66, 67; centrally upon the double I-beam 61 is placed a bolster-plate, 68, securely riveted to the double I-beam 61, and engaging a king-bolt 69, passing with its shank through a bolster-block 70, securely riveted to the underside of the transverse-channel beam 5, and through a king-bolt gusset 71, securely riveted to the top of the channel-beam 5. A reach-rod 72, connects a reach-rod-plate 73, riveted to the under side of the beam 61, with a fork-end casting 74, securely riveted to the transverse-beam 8, in the sub-frame, as clearly shown in Fig. 5.

Transversely through the sub-frame there is journaled in bearings 237, secured to the under-side of the longitudinal-channel beams 2 and 3, a shaft, 80, having on both of its extremities chain-drums 81, which connects with yokes 82 and link-chains 83, with the double I-beam 61; one chain winding upon said drum from the top, and the other from the bottom. Upon this shaft 80, is also mounted a worm-wheel 84, engaging with a vertical shaft 85, having its bearing in a bracket 275, and carrying a worm 86, and a hand-wheel 87, by means of which the machine is steered in an obvious manner, a platform 274, being provided for the operator to stand upon when governing the movement of the machine, said platform 274 being carried upon brackets 79, Figs. 1 and 3, secured to the longitudinal channel-beam 3.

Upon the sub-frame there is securely fastened at the lugs, 88, Fig. 5, a toothed gear, or turn-table base 89, having spokes 90, and a central hub 91, the upper surface of this base being beveled at 92, shown in Figs. 5 and 15, and having a flange 193, Fig. 15, projecting beyond the faces of the gear-teeth for the purpose hereinafter to be referred to, said spokes and central hub being securely riveted to the various longitudinal and transverse-beams, as clearly indicated in Fig. 5. Upon this turn-table base is located the turn-table carrying the entire operating-mechanism, hereinafter to be described, and this turn-table consists of a rectangular casting 93, Figs. 3, 31 and 32, having on its under side a tapering or beveled circular projection 94, corresponding with the beveled projection 92 on the turn-table base and forming a track for anti-friction rollers 103, and a central hub 95, engaging the bore of the hub 91 of the turn-table base as shown in Fig. 32, and serving as a pivot around which the turn-table revolves upon the turn-table base.

Figures 31, 32, 33, 34:
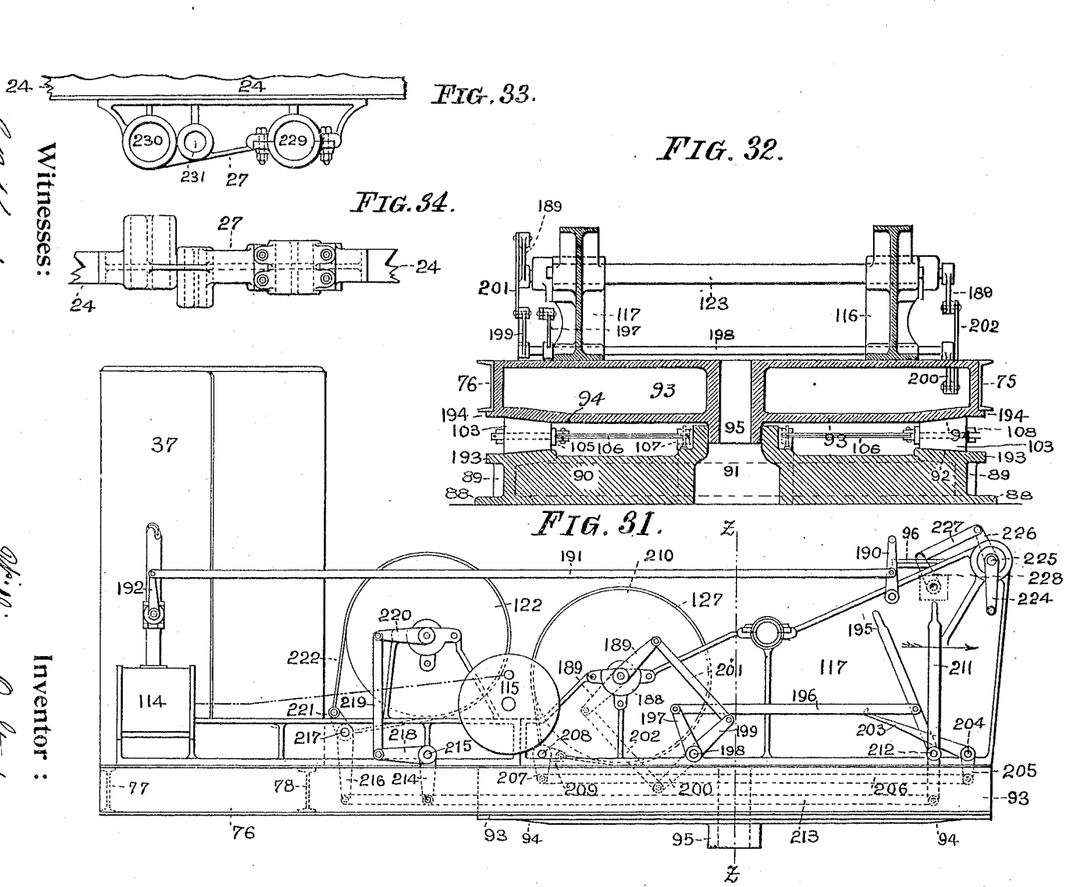

The rectangular turn-table casting 93, Fig. 32, is a hollow body, having along its two longitudinal lower edges projecting ledges, 194, upon which the channel-beams 75 and 76 are carried, these beams being securely riveted to the turn-table casting in an improved manner. The object of making the forward end of the turn-table a heavy casting is to increase the weight of the machine at its forward end as much as possible in order to allow the bucket 162 being forced into the soil when excavating, without lifting the forward end of the machine. There is mounted upon this turn-table a double-cylinder vertical steam engine 96, Figs. 1 and 3, having upon its crank-shaft 97 a worm, 98, engaging a worm-wheel 99, mounted upon a vertical shaft 100, and carrying at its lower end a pinion 101, engaging the toothed periphery of the turn-table base 89, and thereby, and by operating the engine 96 in the proper direction, revolving the turn-table upon the turn-table base. Gibs, 102, Fig. 1, engage the projecting flange 93, Figs.

1 and 15, on the turn-table base to retain the parts in operative position.

Figures 15, 16:
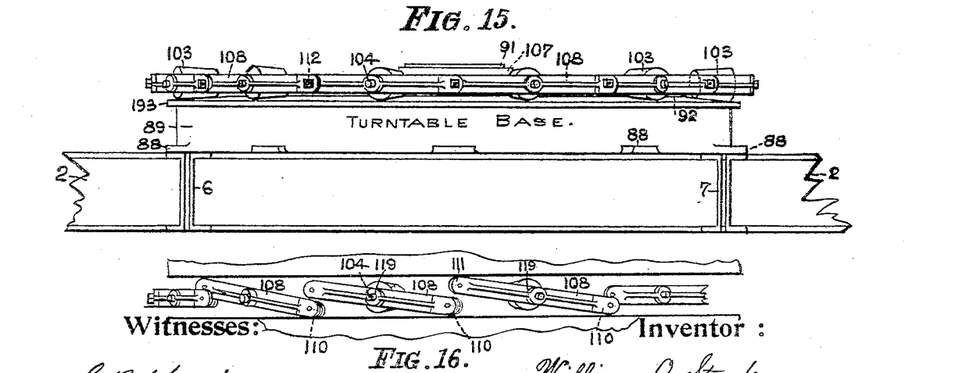
Fig. 15 is a side-elevation of a portion of the sub-frame, and the turn-table base illustrating the roller-bearing employed.
Fig. 16 is a side-elevation of the links connecting the outer-ends of the roller-pintles and illustrating the method of disconnecting the links for the removal of one or more of the anti-friction rollers.
Figures 17, 18, 19, 20:
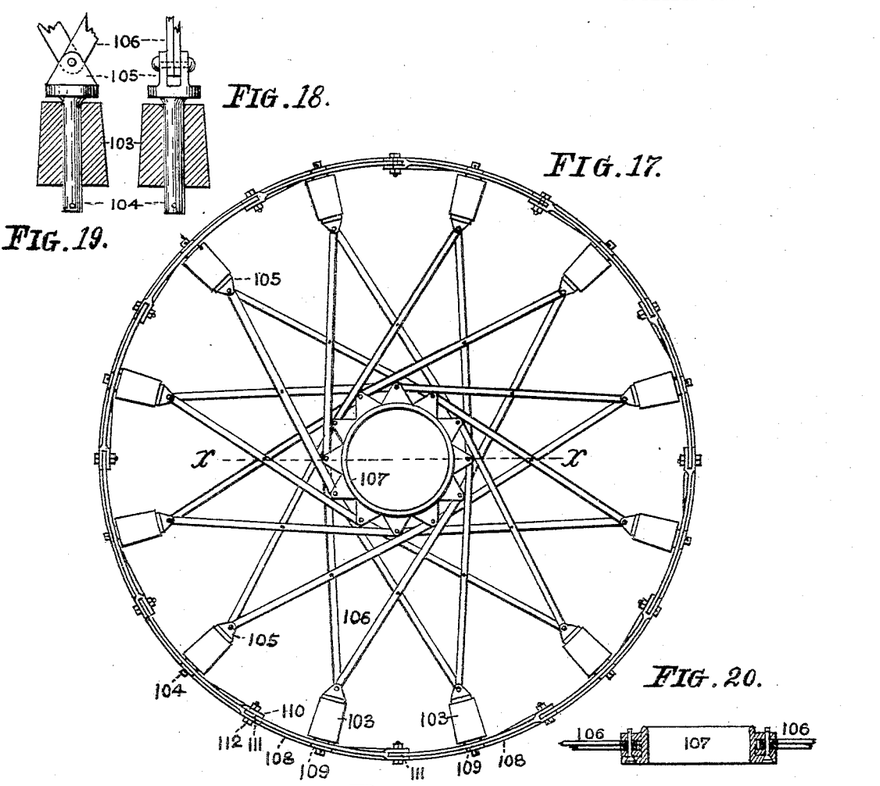
Fig. 17 is a plan of the spider carrying the anti-friction rollers.
Figs. 18 and 19 are sectional-elevations of one of the anti-friction rollers and its pintle.
Fig. 20 is a sectional-elevation of the center-ring of the spider, drawn in line *x*, *x*, of Fig. 17.

The turn-table is supported upon the turn-table base by means of a series of anti-friction rollers, 103, shown in detail in Figs. 15 to 19, mounted upon pintles 104, having double-eyes 105, from which brace-rods, 106, reach to a center ring 107, and thence to oppositely located double-eyes, as clearly illustrated in Fig. 17, whereby an outward-movement of the pintles 104, of the anti-friction rollers 103, is prevented. The outer ends of these pintles 104 are connected to a ring consisting of a series of links, 108, having centrally a bearing 109, for the reception of said pintle 104, and at one end a double-eye 110, engaging the adjacent end 111 of the next succeeding link; a bolt 112, passing through the double-eye 110 and the adjacent end 111 of the next succeeding link, to connect the parts, so that a continuous ring of similar sections of links is formed, which prevent the outward movement of the anti-friction rollers 103. A machine of the class described, being subjected to very severe usage, owing to the nature of the work to be done, and the dirt and grit unavoidably entering, and adhering to, its parts, it frequently happens that one or more of the anti-friction rollers wear flat, and in order to enable their removal and renewal, when necessary, without disturbing the main parts of the machine, I have introduced the link-construction just described, so that by removing the bolts 112 from several adjacent links, and then tilting the links, as shown in Fig. 16, one of their number can be pulled off the corresponding pintle 104, and its anti-friction roller 103 removed and a new one inserted, when necessary, without dismounting any other part or parts of the machine. This is an essential feature of this machine and avoids tedious and expensive delays and interruption of the work when the removal of a flattened anti-friction roller becomes necessary.

The turn-table frame, Figs. 3 and 32, consists, furthermore, of two pairs of longitudinal channel-beams, 75, 76, connected at, and near, their rear-ends by two transverse I-beams 77, 78, Fig. 3, the intervening spaces between these beams being filled in with planks, not shown in the plan Fig. 3, to provide a level floor upon which the operator of the machine may walk.

The steam-generator 37, already referred to, is mounted upon the rear-end of the turn-table platform or frame, as shown. On both sides of this steam-generator are located horizontal steam engines, 113, 114, having a common crank-shaft 115, traversing the turn-table platform, and having its bearing in the standards 116, 117, and carrying a pinion 118, engaging a spur-wheel 119, Figs. 3 and 28, and a further pinion 120, engaging a spur-wheel 121, mounted upon a shaft carrying a winding drum 122, the object of which will hereinafter appear.

Figures 28, 29, 30:
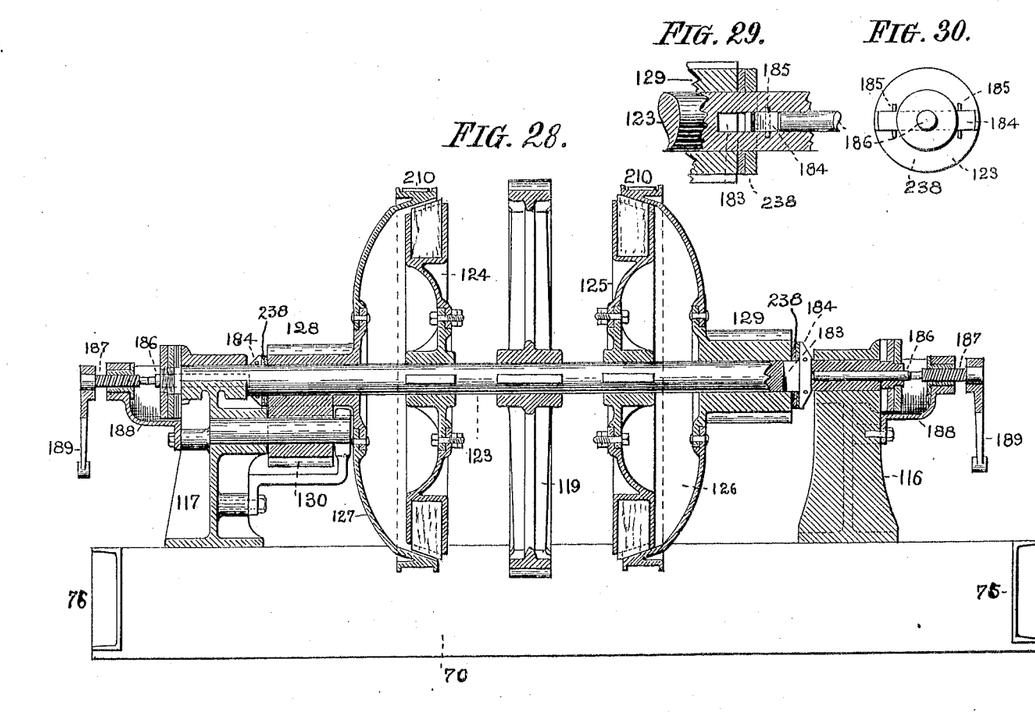
Fig. 28 is a sectional elevation in line *y*, *y*, of Fig. 4 of the friction-clutch mechanism used in the machine, for elevating and lowering the boom.
Fig. 29 is a sectional view of the shaft of the same drawn to a larger scale to more clearly illustrate the construction.
Fig. 30 is an end-view of the same.

As shown in Fig. 28, the spur-wheel 119 is keyed upon a shaft 123, together with two friction-clutch-disks 124, 125, one on each side of the spur-wheel 119, and there are upon the same shaft and adjacent to the friction-clutch-disks 124, 125, two brake-disks 126, 127, which are formed integral with two pinions 128, 129, the latter being of larger diameter than the former, and this one, 128, engages with an intermediate or idler-pinion 130, which pinions 130 and 129, engage two spur-wheels, 131, 132, Fig. 3, mounted upon a shaft 133, having its bearings in the standards 116 and 117, and carrying two pinions 134, 135, meshing with two segmental-gear-wheels 136, 137, fastened upon a shaft 138, also having its bearings in the standards 116 and 117.

Figure 12:
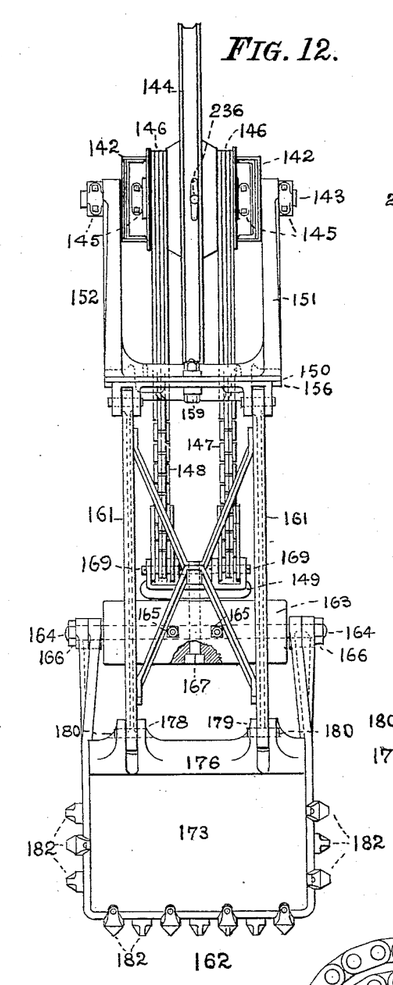
Fig. 12 is an end, and Fig. 13 a side-elevation of the clam-shell bucket and part of the boom.
Figure 13:
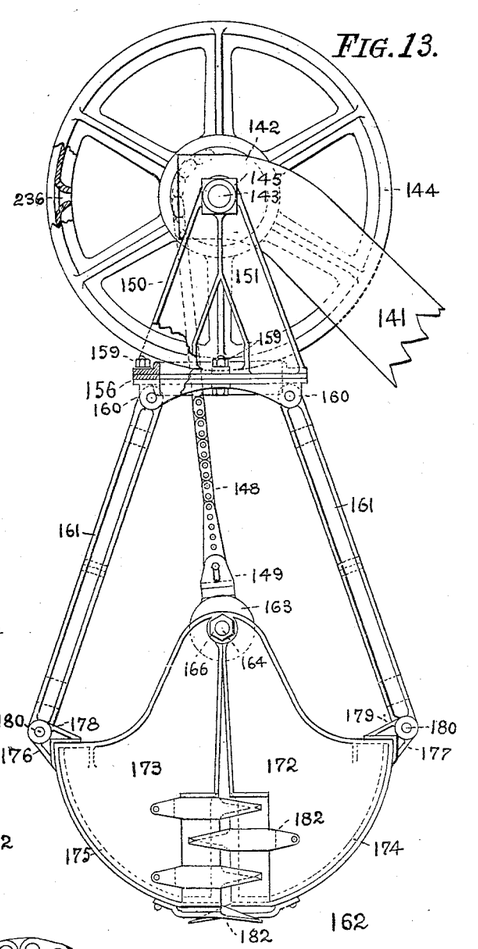
Figure 14:
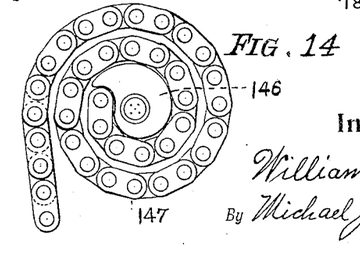
Fig. 14 is a plan of the link-chain employed in closing the bucket, and the cam to which one end thereof is attached.

The segmental gear-wheels, 136 and 137 are formed integral with plates, 139, 140, which constitute cheeks for a boom 141, of structural-iron construction properly secured to the cheeks 139, 140, and having a curved outer-end 142, within which is pivoted a shaft 143, Figs. 12 to 14, carrying a rope-sheave 144, said shaft being retained in position and the curved end of the boom 141 prevented from spreading, by four clamping-collars 145, shown in Fig. 12.

The rope-sheave 144 is formed integral with two chain-cams, 146, one of which is shown in Fig. 14, to which are permanently secured one end of link-chains 147, 148, the other ends of which are fastened in a yoke 149, as will hereinafter more fully appear.

Figures 21, 27:
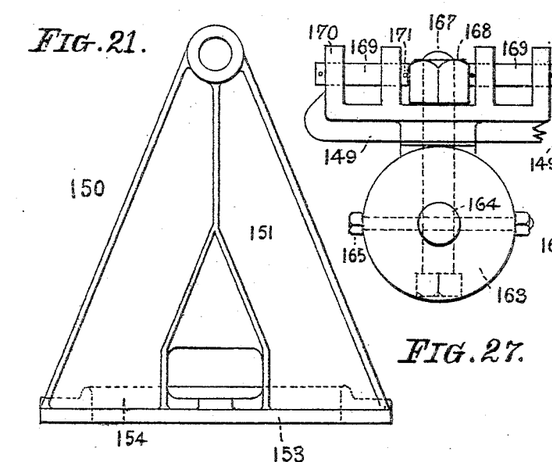
Fig. 21 is a side-elevation of the stirrup of the bucket-operating mechanism.
Fig. 27 is an end-elevation of the same.
Figure 22:
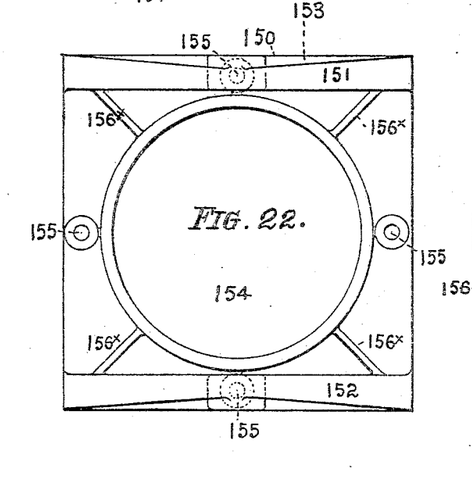
Fig. 22 is a plan of the same.

From both ends of the shaft 143 and adjacent to the curved end of the boom 141, is suspended a stirrup 150, shown in detail in Figs. 21 and 22, and consisting of two side-pieces or cheeks 151, 152, and a bottom-plate 153, formed integral with said cheeks, and having centrally a large, circular opening 154, and centrally at its sides four (or more, if desired) bolt-holes 155, said bottom-plate being provided with strengthening ribs 156$^x$, as illustrated in Fig. 22.

Figure 23:
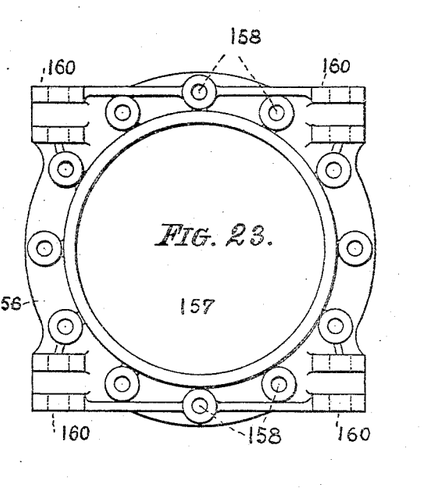
Fig. 23 is a plan of the stirrup-plate carrying the bucket, said plate being bolted to the stirrup when assembled in the machine.
Figures 24, 25:
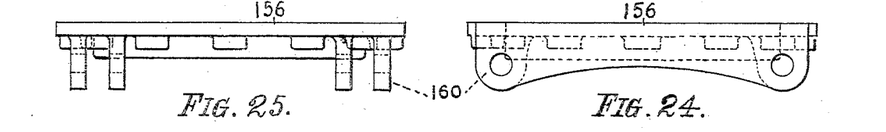

To the stirrup 150 is removably secured a stirrup-plate 156, shown in detail in Figs. 23, 24 and 25, said stirrup-plate having a central opening 157, and twelve, (more or less, if desired,) bolt-holes 158, any corresponding four of which register with the bolt-holes 155, in the bottom-plate 153, so that the stirrup-plate may be removably secured to the stirrup by bolts 159, Fig. 13, in any of the twelve different positions into which it is capable of being placed. On the under side of this stirrup-plate 156, and at its four corners, are located four, downwardly-projecting and perforated, double-eyes 160, to which are pivoted or bolted four links 161, which connect the stirrup-plate 156 with a clamshell bucket, 162, shown in detail in Figs. 12 and 13 in a closed, and in Figs. 1, 3 and 4 in an open position.

Figure 26:
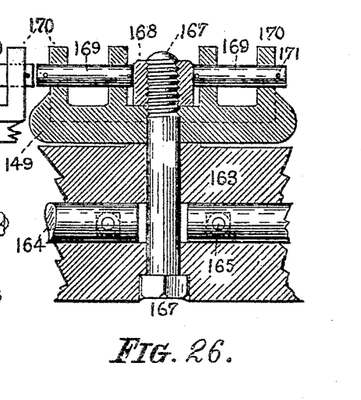
Fig. 26 is a sectional-elevation of a portion of the bucket-opening weight and the double-eyed yoke to which the bucket-closing chains are attached.

The clam-shell bucket 162 consists of two symmetrical halves pivoted to a bucket-opening weight, 163, by bolts, 164, shown in detail in Figs. 26 and 27, which weight consists of a preferably cylindrical, centrally-bored casting, within which the bolts 164 are secured by transverse bolts 165, said bucket-halves being prevented from spreading by nuts, 166, Figs. 12 and 13, on the outer ends of the bolts 164. Centrally and transversely through the bucket-opening weight 163 is passed a vertical bolt 167 by which the double-eyed yoke 149 is pivoted to the weight 163. A nut, 168, on said bolt, as shown in Figs. 26 and 27, is retained in position and prevented from unscrewing by pivot-bolts 169, in the double-eyes 170, abutting against the opposite faces of said nut, said pivot bolts 169 being prevented from laterally moving by cotter-pins 171.

The lower ends of the link-chains 161 connect with the double eyes 170 on the yoke 149 by the pivot bolts 169, and these link-chains pass through the circular openings 154 and 157 in the stirrup and the stirrup-plate, said openings being made circular, and the yoke 149 on the bucket-opening weight 163 being swiveled thereto, so that the bucket may be placed into any desired position relative to the boom, and the link-chains 147 and 148 always lead fair from the cams 146 to the said yoke 149.

The clam-shell bucket 162 consists, as stated, of two similar halves, each of which has two cast-metal sides 172, 173, and sheet-metal curved ends, 174, 175, all securely riveted together in the usual manner, and having cross-bars 176, 177, provided with two pairs of double-eyes, 178, 179, to which the lower ends of the links 161 are pivoted by bolts 180. Around the open edges of the sides and ends of the bucket are riveted spuds, 182, terminating in sharp points, one set of these spuds on one half of the bucket being intermediate of that of the opposite half, as clearly illustrated in Figs. 12 and 13.

Referring to Figs. 28, 29, and 30, it will be seen that the two friction clutch-disks 124 and 125 are keyed to the shaft 123, while the two brake-disks 126 and 127 are loose upon the same. In order to engage one or the other, but only one at a time, of these brake-disks with the friction-clutch-disks 124, 125, the shaft 123 is provided near its ends with slots 183, wherein are movably located bars 184, which are prevented from falling out of the slot 183 by pins, 185, as clearly illustrated in Figs. 29 and 30. The ends of this shaft are centrally and longitudinally bored to the slots 183, and hardened steel-pins, 186, placed into these bores, one end of the pins pressing upon the bars 184, and the other end resting against coarsely-threaded screws, 187, located in brackets 188, secured to the standards 116 and 117. Levers, 189, are fastened to the ends of these screws 187, and these levers are connected with a hand-lever 195, hereafter to be referred to, in such a manner that when moved through an angle of approximately 120 degrees the screws 187 will push the pins 186 and the bars 184 against metallic disks 238 in front of the pinions 129 or 128, as the case may be, and thereby move the proper brake-disk into contact with the proper friction-clutch-disk, and thereby revolve the said brake-disk and through it and the train of gearing, consisting of the spur-wheels 131, 132, and pinions 134 and 135 operate the boom 141 through the segmental gear-wheels 136 and 137. I may here mention that there are two of the segmental gear-wheels 131 and 132; two pinions 134 and 135, and two of the spur-wheels instead of one only, to guard against interruption of the operation of the machine should, for any reason, any of the cogs or teeth on one or the other of these gear-wheels break, the proportions or dimensions of these gear-wheels being such that a single set will be amply strong to stand the strain to which they are subjected when the machine is in operation in digging and excavating.

It will be observed that the gear-pinion 129 meshes directly into the spur-wheel 132, but the pinion 128 engages the spur-wheel 131 through the intermediate pinion 130. The speed of the shaft 123 remaining constant, the pinion 129 and the train of gearing already mentioned, move the boom vertically upward at a certain speed, but the pinion 128 being smaller, the boom 141 will be moved vertically downward at a slower corresponding speed. This has been thus planned in order to enable me to increase the power with which the boom will force the bucket into the soil.

The operator of this machine places himself on the right-hand side of the forward end of the machine when the same is excavating or cutting a trench, so that he may watch the operation of the bucket, and he has all the levers, &c., by which the various operating mechanism are controlled within easy reach. As shown in Fig. 31, a hand lever 195, which controls the boom to crowd the bucket into the soil, and also hoists the boom, connects by a link 196, a lever 197, fixed upon a shaft 198, which shaft carries further levers 199 and 200, (the lever 199 connecting with the lever 189 on the right-hand side of the machine, by a link 201, and the lever 200 by a link 202 with the lever 189 on the left-hand side of the machine) and operate the screws 187 to throw either the friction-clutch 127 into contact with the friction-disk 124, or the friction-clutch 126 into contact with the friction-disk 125, whereby the boom 141 is either raised or lowered, as the case may be. A lever 190, and a link 191, connects with the throttle-valve 192 to start the engines 113 and 114, which, through the gearing 118 and 119, revolves the shaft 123 upon which the friction-clutches 126 and 127 are mounted.

A foot-lever 203, secured to a shaft 204, connects by a lever 205 and a link 206 with a brake-lever 207, upon a transverse shaft 208, upon which are fixed two brake-levers 209, which levers engage the brake-bands 210, embracing the brake-surfaces on the brake-disks 126 and 127 to hold the boom 141 in any position when so desired.

A bucket-closing lever 211, upon a shaft 212, has a pendent arm which connects by a link 213, with a lever 214, upon a shaft 215, and a further lever 216, upon a shaft 217. Upon the shaft 215 is fixed a lever 218, which, by a link 219, connects with a thrust-lever 220; a screw-and-pin, and bar-mechanism, the same as shown in Figs. 28, 29 and 30, in connection with the clutch-mechanism that operates through its various gearings the boom 141, is provided for in order to connect the shaft upon which the hoisting drum 122 is located with the gear-wheel 121. Upon the shaft 217 is fixed a brake-lever 221, which connects with the brake-band 222 upon the brake-surface 223 on the hoisting drum 122.

A crank 224, is fastened on a shaft 225, passing through the shaft 138 upon which the boom is mounted, and has at its opposite extremity a lever 226, which connects by a link 227, with the reversing-valve 228 on the vertical, double-cylinder, steam-engine 96, and through the gearing heretofore described controls the rotary movement of the turn-table already referred to.

Having thus fully described this invention, I shall proceed to explain its operation, the machine having been moved into position for excavating, by its own power from the traction-motor 13, and the gearing acting upon the traction-wheels 30: Assuming the boom 141 to be up, as shown in dotted lines in Fig. 4, and it is intended to lower it in order to force the bucket 162 into the soil to pick up a load; the treadle 203, which controls the brake on the friction-clutches 126 and 127 is released, and thereby the boom 141 allowed to descend by gravity, its weight, together with that of its appurtenants being sufficient to reverse the gearing intervening between the said boom and the friction-clutches 126 and 127. Now the bucket-closing lever 211 is placed into the position shown in Fig. 31, which releases the brake on the hoisting-drum 122 (and the hoisting-rope 232, Figs. 1 and 4, connecting this drum with the rope-sheave 144,) and allows the bucket to open, the weight of the bucket-opening weight 163 being sufficient for this purpose. Now the bucket-crowding lever 195 is placed into the position shown in Fig. 31, which, by means of the link 196, lever 197, lever 199 and link 207, acts upon the lever 189 and the screw 187, Fig. 28, to force the friction-clutch-disk 127 into frictional contact with the friction-disk 124, and through the pinions 128 and 130, Fig. 3, and the gear-wheel 131, and pinion 135, cause the gear 137 on the cheek 140 of the boom 141 to revolve around its shaft 138, and thereby the end of the boom with the bucket 162 to be crowded into the soil by means of the links 161 connecting this bucket with the stirrup 150 and stirrup-plate 156. Motion to the friction-clutches through the gear-wheel 119 and shaft 123 upon which it is mounted, is communicated thereto from the double-cylinder steam engine 113 and 114, by the train of gearing already described.

When the bucket 162, is being forced into the soil, the bucket-closing weight 163 rests upon the soil, and it being of considerable bulk, forms, as it were, an abutment so that, the boom being crowded downward, the two wings of the bucket are forced into the soil and caused to close; the spuds 182, on the edges of the same, assisting in penetrating the soil. At the same time, the bucket-closing lever 211 is moved into the direction shown by an arrow in Fig. 31, causing the brake on the hoisting-drum to release the same, and by the levers 214, 218, and link 219, to operate the lever 220 on the hoisting-rigging to connect the gear-wheel 120 with the hoisting-drum, and thereby to revolve the rope-sheave 144 in the proper direction. This will cause the cams 146 to revolve with the said rope-sheave, and to wind the two link chains 147, 148, upon the cams, and thereby to lift the bucket-closing weight 163, and to close the bucket 162, which now contains the soil which it has picked up. The boom 141 is now raised by moving the bucket-crowding lever 195 into the direction indicated by an arrow, which will release the friction-clutch 127 and connect the friction-clutch 126 with the shaft 123, and through the gearing 129, 132 and 134, engage the segment gear 136 on the cheek 139. At the same time, the operator holds the bucket closed by keeping sufficient friction upon the hoisting-drum, and by holding the brake thereon until it is desired to open the bucket and to drop its contents. When the boom has been elevated sufficiently to clear the surrounding ground, the turn-table is revolved by actuating the hand-crank 224, and through it the reversing valve 228 on the double-cylinder vertical engine 96 in the proper direction to swing the boom horizontally into the desired position, the foot-treadle 203 having been kept depressed during this time to steady the boom, if necessary.

In order to open the bucket, the lever 211 is returned to the normal position, shown in Fig. 31, and thereby the hoisting-drum 122 released, when the bucket-opening weight will drop and force the bucket open. These operations are repeated at a rate of about two cycles (or in other words, two bites and dumps) per minute. It is understood that the normal position of the levers 195 and 211 is a vertical one. A movement in either a forward or a rearward direction causes the several trains of gearing, &c., to be thrown into, or out of, action, as heretofore described.

Figure 4:
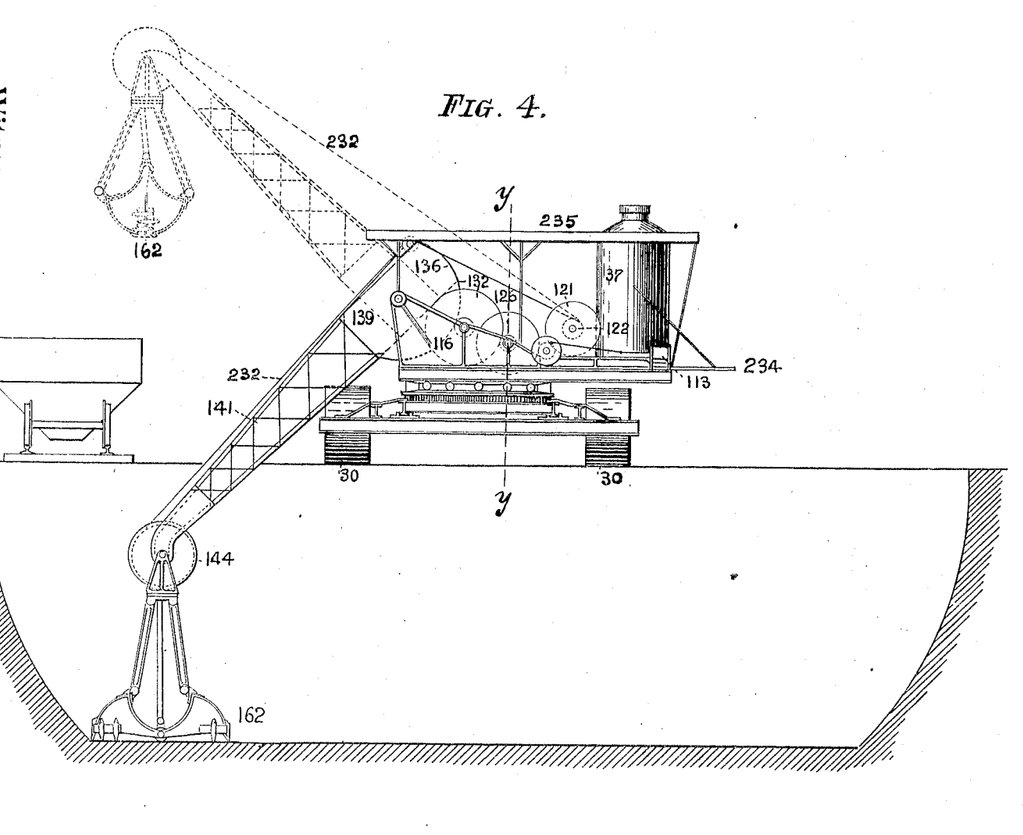
Fig. 4 is a side-elevation of the same, showing the device in use in cutting a channel, &c.

As shown in Figs. 1 and 4, the turn-table is provided with a platform 234, upon which the operator in charge of the steam-generator will take his position for firing, &c., and a canopy 235, is placed thereon to protect both operators from the inclemencies of the weather.

It will be noted that, as shown in Figs. 12 and 13, the rope-sheave 144 has a hole, 236, through which the hoisting-rope 232 is passed and there securely fastened.

When the bucket 162 is closed and the two link-chains 147 and 148 wound upon the cams 146, (the convolutions of the chain rest upon one another, thereby, as it were, increasing the diameter of the arm) the hoisting-rope has nearly unwound from the rope-sheave, while, as the bucket-opening weight descends and the two link-chains unwind, the hoisting-rope will be wound upon the rope-sheave; approximately two turns of the rope-sheave being required to fully open the bucket.

It will be further observed that when the two link-chains 147 and 148 begin to be wound upon the cams 146, the diameter of the cams are the smallest, but gradually increases as the chains coil upon one another. Thus the proportion, or ratio, of leverage of the rope-sheave and the link-chain cam at the commencement is as 6 is to 1, while at the moment when the bucket is closed it is only about 3 to 1. It will, therefore, be seen that when the bucket is started on its closing movement the leverage between the cams and the rope-sheave is the greatest, and that this leverage gradually diminishes, as the closing of the bucket, and the resistance offered thereto by the soil lessens. This feature is an important one in a machine of the nature set forth, and it is accomplished by comparatively simple and inexpensive mechanism.

I have heretofore stated that the bucket is suspended from the boom by the stirrup 150, and stirrup-plate 156, in conjunction with the links 161. By changing the position of the stirrup-plate relative to that of the stirrup, I am enabled to place the bucket in any one of twelve different positions or through an angle of 360 degrees. The result of this construction is as follows: By arranging the bucket, as shown in the drawings, I am enabled to dig a trench the width of the bucket; by turning the bucket 90 degrees, I am enabled to dig a trench equal to the distance between the two extreme ends of the bucket when open. Again: when there is not sufficient room behind the machine to work efficiently and the machine must be run alongside of a trench, the bucket will have to be set at an angle corresponding to the position of the machine, so that no matter in what position the machine may have to be placed, the bucket can be set to cut the required width of the trench in progress of excavation. Furthermore, by securing the bucket to the stirrup as described, it can be readily and quickly removed and replaced by a wider or narrower bucket, or for making repairs, or for substituting an orange-peel bucket for the clam-shell bucket shown.

I here call attention to the fact that when the boom with its bucket has descended and the latter is to be closed, it is held down upon the ground by a force equal to the entire weight of the machine, the power of the double-cylinder engine 113 and 114, many times multiplied by the train of gearing the operates the boom, being sufficient to lift the entire machine off the ground at its forward end, a condition which, however, is not likely to happen in the regular course of operating the machine.

The machine described is, in its entirety and when in condition for operating, too large and too high to be placed upon any railway car and in order to ship it by rail, it has to be dismounted. To do this in the shortest possible time and by the removal of the least number of parts, and at the least possible expense and using the power plant of the machine for hoisting, &c., I proceed as follows:

I first run the entire machine upon a platform-car or so-called flat, and then remove the platform 274 and brackets 79 together with the steering-mechanism which projects below the beams 2 and 3, and then block up the machine under these beams. I now remove the four bolts 58, which connect the traction truck to the sub-frame, and by hitching the rope 232 (or a separate rope running from the hoisting-drum 122 over the rope-sheave 144,) onto the traction truck, pull the same away from the sub-frame and load it upon a separate car. I also remove the double I-beam 61 and its appurtenants, comprising the steering wheels, &c., and then lower the remaining parts of the machine, consisting of the sub-frame and the turn-table, &c., in which condition the car will readily pass under bridges and through tunnels without removing any other portion or parts from the machine.

It is obvious that the machine heretofore described may be readily used as an ordinary locomotive-crane by removing the bucket with its stirrup and sheave and substituting a plain sheave in place of the special sheave 144, heretofore described. It may also be mounted on regular car-trucks to be used for railroad work in digging as well as hoisting, a fact which will be readily understood.

Having thus fully described my invention, I claim as new and desire to secure to me by Letters Patent of the United States—

1. In an excavating and trenching machine, a boom; a horizontal axis upon which said boom is mounted; standards having bearings for said boom; segmental gears at the pivoted end of the boom concentric with the axis of the boom; gearing engaging the segment-gears, and means for operating the gearing.

2. An excavating and trenching machine comprising suitable trucks upon which the machine is mounted; a sub-frame; a turn-table upon said sub-frame; suitable motors upon said turn-table, a boom pivoted on one end to standards upon said turn-table, and gearing for connecting the motors with the boom; said boom having segmental gears at its lower end concentric with the axis of the boom and engaging the gearing, whereby said boom is vertically raised and lowered around its axis.

3. In an excavating and trenching machine, suitable trucks upon which the machine is mounted; a sub-frame; a turn-table upon said sub-frame; motors upon said turn-table; standards upon said turn-table; a boom pivoted with one end to said standards; gearing connecting the motors with said boom, there being segment-gears on the pivoted end of said boom engaging said gearing, and means for rotating said turn-table with its boom and motors bodily upon said sub-frame.

4. An excavating and trenching machine including a vehicle comprising a sub-frame; a propelling-truck upon which said sub-frame is mounted, a steering-truck under said sub-frame, and a turn-table upon said sub-frame and adapted to revolve thereon; standards upon said turn-table; a motor upon said turn-table; a boom pivoted to the forward ends of said standards, there being segmental-gears on the pivoted end of said boom; gearing connecting the motor with said segmental gears, and means for rotating the turn-table.

5. In an excavating and trenching machine, a traction-truck; traction-wheels in said truck; a motor in operative engagement with said traction-wheels and located upon said traction-truck; a steering truck; steering-wheels on said truck; mechanism for operating the steering-truck; a sub-frame mounted upon said trucks; a turn-table mounted upon the sub-frame; a motor upon said turn-table for operating the turn-table; a boom pivoted at its lower end and having gear-wheels concentric with the pivot of said boom; a motor in operative connection with said boom for rotating it around its axis, and a bucket attached to the outer end of the boom.

6. In an excavating and trenching machine, a traction-truck; a motor upon said truck; traction-wheels in said truck; gearing connecting the motor with the truck; and a sub-frame, said traction-truck being removably secured to the sub-frame.

7. In an excavating and trenching machine, a traction-truck, consisting, essentially, of longitudinal I-beams, and transverse-channel-beams properly secured by gussets, a motor secured to longitudinal beams carried below the transverse-channel-beams by braces; a pinion upon the motor-shaft; a counter-shaft carrying a gear-wheel on one end engaging the pinion on the motor-shaft; a pinion on the counter-shaft, a transverse-shaft; a differential gearing upon said transverse-shaft engaging with the pinion on the counter-shaft; traction-wheels at opposite sides of the truck-frame; internal gears within said traction-wheels, and pinions on the transverse-shaft engaging the internal gearing within the traction-wheels.

8. In an excavating and trenching machine, a steering-truck consisting essentially, of a double-channel-beam; a bolster-plate securely fastened centrally and upon the upper sides of the channel-beams; a reach-plate securely fastened centrally to the lower sides of the channel-beams; a reach-rod passing through the bolster and reach-plates; bearings at and near the outer ends of said beams; shafts in said bearings; steering-wheels upon said shafts; a sub-frame; a bolster-block centrally at the end of the sub-frame; a gusset-plate centrally secured to the upper surface of the transverse end-beams of said sub-frame; a king-bolt connected to the bolster-plate, and means for rotating the truck below the sub-frame.

9. In an excavating and trenching machine, a boom pivoted at its lower end within standards, there being segmental gear-wheels on the lower end of said boom concentric with the pivot of the boom; means for operating said boom and engaging said segmental gear-wheels and a bucket suspended from the free end of the boom but journaled or pivoted thereto, and means for opening and closing the bucket, whereby said bucket is crowded into the soil by the descending free end of the boom.

10. In an excavating and trenching machine, a platform; standards upon said platform; a boom pivoted with one end in said standards; means for operating said boom; a stirrup at the free end of said boom and pivoted thereto; links pivoted to said stirrup with one end and to an excavating bucket at their opposite ends, and means for opening and closing said bucket.

11. In an excavating and trenching machine, a boom pivoted at one end; means for operating said boom; a stirrup at the free end of said boom and pivoted thereto; a stirrup-plate removably secured to said stirrup, there being a series of double-eyes projecting downwardly from said stirrup-plate; links engaging said double-eyes with one end; a bucket engaging said links with their opposite ends, and means for opening and closing said bucket.

12. In an excavating and trenching machine, a boom pivoted at its lower end; means for operating said boom; a transverse-shaft at the free end of said boom; a rope-sheave revolving freely upon said shaft; chain-cams on both sides of said sheave; a stirrup suspended from the free end of said boom; a stirrup-plate removably secured to said stirrup, there being a series of double-eyes on the lower side of said stirrup-plate; links pivoted with one end in said double-eyes; a bucket-closing weight; a double-eyed yoke pivoted to said bucket-closing weight; link-chains connected with one end to said chain-cams and with the other ends to said double-eyed yoke, and a bucket having double-eyes connecting with the lower ends of said links.

13. In an excavating and trenching machine, a pivoted boom; a stirrup pivoted to the free end of the boom; a bucket suspended from said stirrup by means of links; a bucket-opening weight pivoted to the hinged sides of said bucket and means for elevating and lowering said weight, whereby the bucket is opened and closed by elevating and lowering said weight.

14. In an excavating and trenching machine, a pivoted boom; means for raising and lowering the boom at its free end; a stirrup pivoted to the free end of said boom; a bucket suspended from said stirrup, said bucket having double-eyes; links connecting the stirrup with the double-eyes of said bucket; a bucket-closing weight pivoted between the hinged ends of the two halves constituting the bucket; a double-eyed yoke pivoted to said bucket-closing weight; link-chains pivoted with one end to the double-eyed yoke; a rope-sheave journaled at the free end of said boom; cams on both sides of said rope-sheave to which the other end of the link-chains are secured and means for rotating the rope-sheave, whereby the link-chains are wound upon said cams.

15. In an excavating and trenching machine, a boom; a stirrup pivoted to the free end of said boom, there being a bottom plate formed integral with the two sides of the stirrup and having a central aperture or opening, and a series of bolt-holes therethrough; a stirrup-plate removably secured to said stirrup by bolts; there being a multiplicity of bolt-holes in one of the plates registering with those of the opposite plates whereby one of the plates may be fastened to the other plate in various positions, and a bucket suspended from the stirrup-plate.

16. In a trenching and excavating machine, a pivoted boom; a stirrup pivoted to and suspended from, the free end of said boom; a bucket consisting of similar halves pivoted together and means for opening and closing said bucket; said means comprising a heavy casting pivoted to the bucket at the points where the two halves are pivoted together; means for raising and lowering this heavy casting, and means for crowding the boom downward and holding it in a fixed position when the heavy casting is being elevated thereby closing the bucket to pick up a load.

17. In an excavating and trenching machine, a bucket and a bucket-closing weight consisting of a cylindrical body; longitudinal bolts projecting from the ends of said body; transverse bolts for retaining the longitudinal bolts in position, a pivotal bolt centrally and vertically through said cylindrical body, a yoke at the upper end of said bolt and means for raising said bucket-closing weight, said bucket-closing weight being pivoted to the bucket by the said longitudinal bolts.

18. In an excavating and trenching machine, a pivoted boom; a bucket, pivoted to and suspended from, the free end of said boom; a bucket-opening and closing weight pivoted to the bucket; link-chains for raising the bucket-opening and closing weight; a rope-sheave journaled at the free end of said boom; cams on both sides of said sheave, one end of said link-chains being secured to the bucket-closing and opening weight, and the other ends to the said cams, one coil of the chain winding upon the next preceding coil, whereby the ratio of lifting power of the cams increases and diminishes as the link-chains are wound up or unwound.

19. In an excavating and trenching machine, a pivoted boom; segmental gear-wheels at the pivoted end of said boom and concentric with its pivot, a motor, and a friction-clutch shaft and friction-clutch gearing for actuating said boom, said friction-clutch gearing consisting of two independent friction-clutches having pinions as described; a counter-shaft having gear-wheels engaging the pinions on the friction-clutches; pinions on said countershaft engaging the segmental gear-wheels on the pivoted end of the boom; means for rotating the friction-clutch shaft, and means for causing the engagement of one or the other of the friction-clutches, but one at a time only, whereby the boom is raised and lowered by revolving it around its pivot.

In testimony that I claim the foregoing as my invention I have hereunto set my hand in the presence of two subscribing witnesses.

WILLIAM O. STARK.

Attest:
MICHAEL J. STARK,
A. G. PETERSON.